United States Patent Office 3,172,941
Patented Mar. 9, 1965

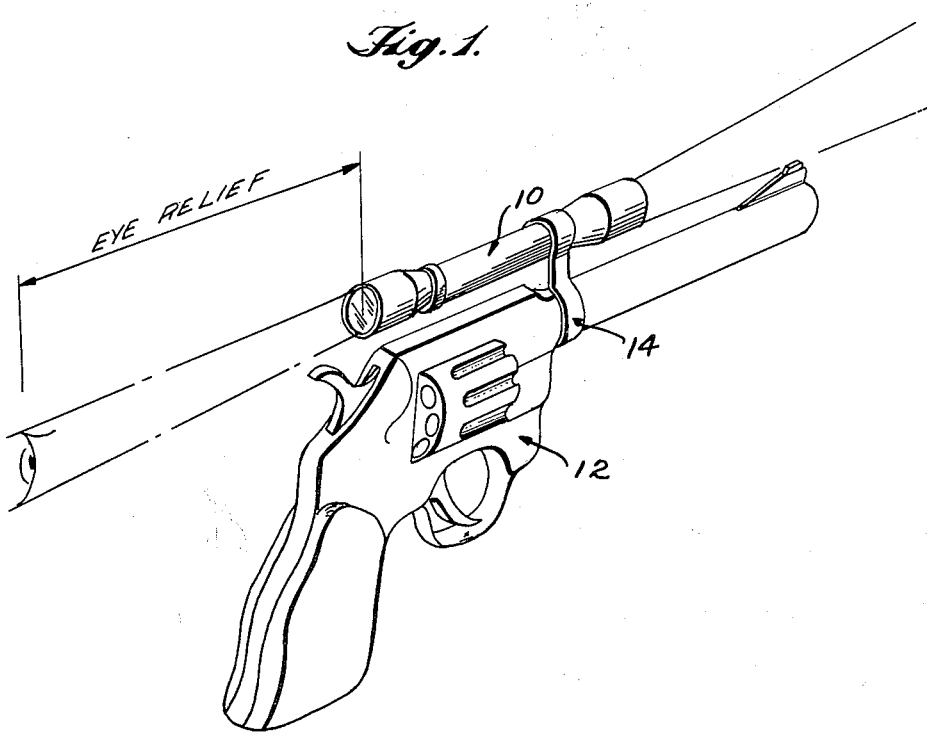
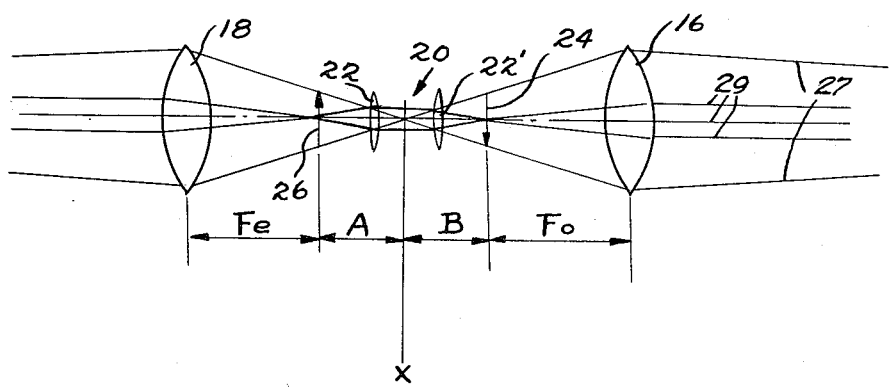

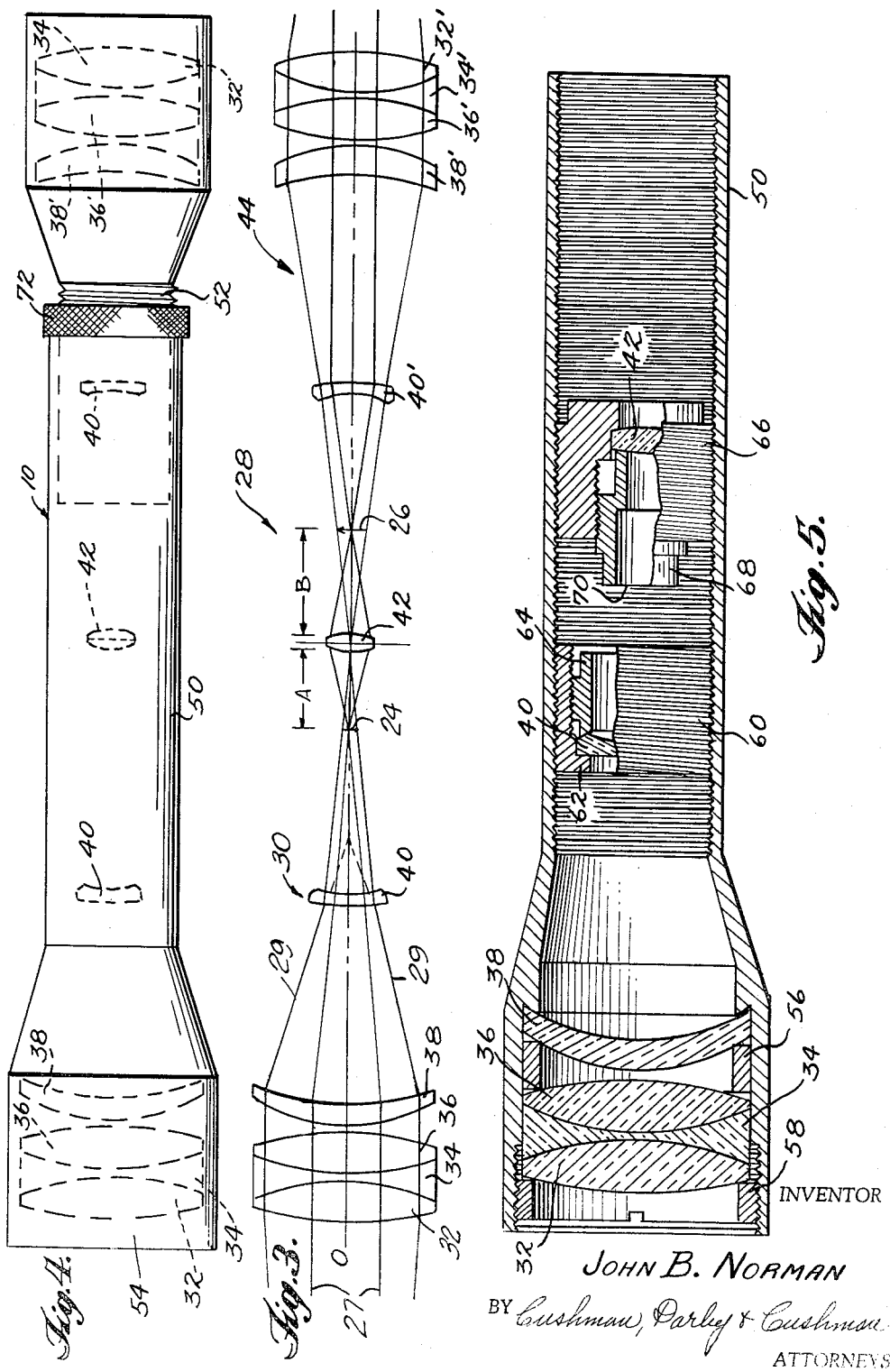

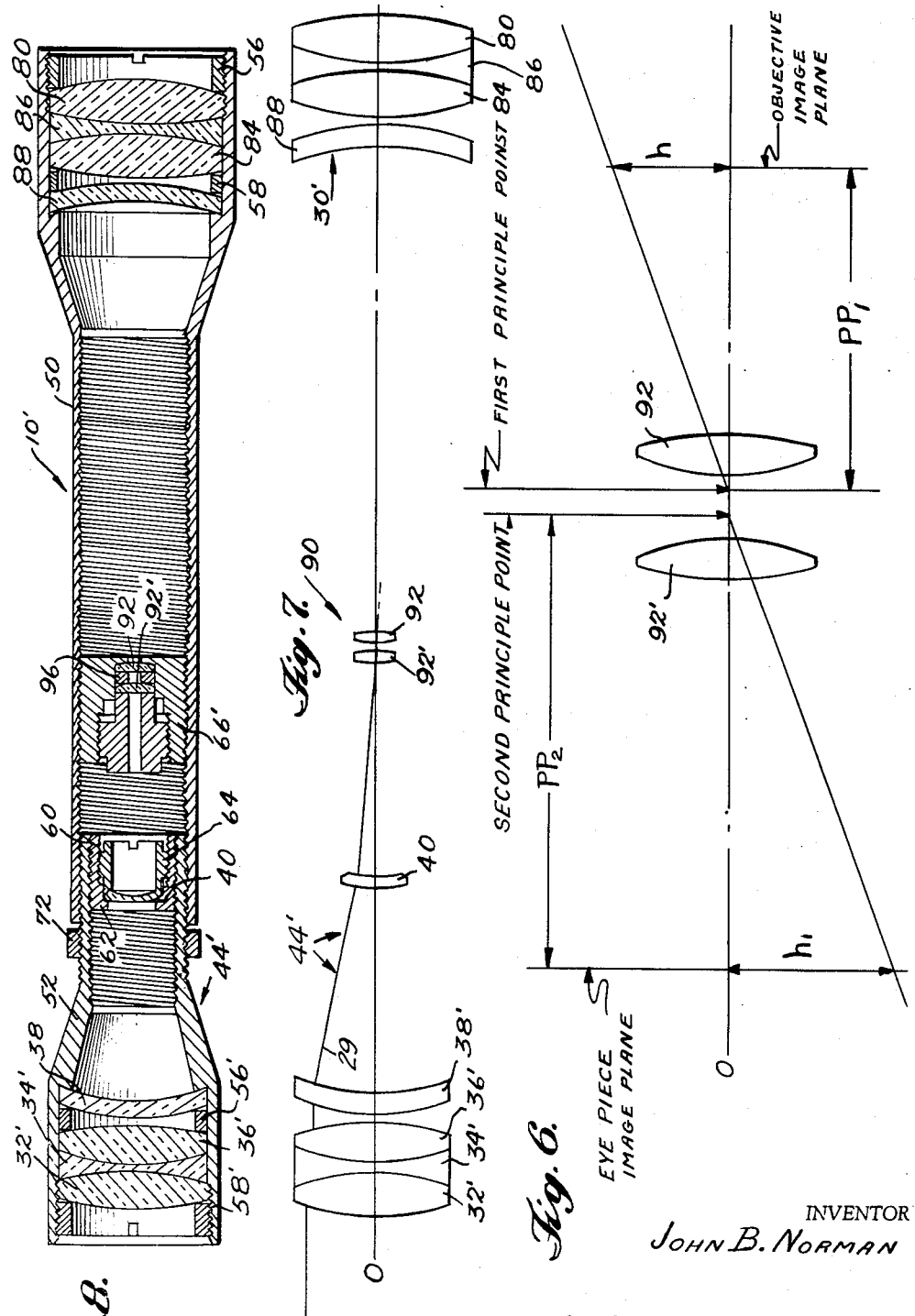

3,172,941
FIREARM TELESCOPIC SIGHTS WITH EXTENDED
EYE RELIEF
John B. Norman, Tyler, Tex., assignor to Electro-Optics,
Inc., Tyler, Tex., a corporation of Texas
Filed Feb. 2, 1961, Ser. No. 86,764
1 Claim. (Cl. 88—32)

This invention generally relates to optical systems, and more particularly, to telescopic sights for firearms and the like, of a reduced overall length and having an extended eye relief.

Due to the inherent physical characteristics of telescopic rifle sights, such sights are not suitable for use with pistols and the like. The heretofore known scopes which achieve the desired proportionate target magnification, provide a resulting weight increase which serves to destroy gun balance necessary for optimum accuracy. Moreover, telescopic sighting devices normally require only negligible eye relief since they are generally designed to be utilized with a relatively short eye relief distance. The aforementioned defects of long overall length and accompanying increase in weight, as well as relatively short eye relief, makes the conversion of a conventional rifle scope for use with hand pistols completely impractical, particularly since a pistol is held at arms length during firing, with a resulting loss of leverage and balance.

It therefore is a primary object of the present invention to obviate the above disadvantages by providing a telescopic sight of minimum overall length and capable of extended eye relief.

An additional object of this invention is the provision of a novel lens system for achieving optical magnification of the target imagery when the telescopic sight is positioned at arms length from the observer.

A further object of the present invention resides in the utilization of negative telephoto lens means for achieving extended eye relief in a scope of an overall length, in the order of magnitude of 5 inches.

Another object of this invention resides in an improved erector lens system capable of varying the magnifying power of the telescopic sight without disturbing reticle definition or substantially distorting optical imagery.

A further object of the present invention is the novel utilization of an erector lens system in combination with negative lens means for achieving a reduction of the optical distance to the eye while maintaining substantial physical eye relief of between 18 to 27 inches.

A still further object of this invention is to provide a telescopic sighting device which is particularly adapted for pistols and the like, which is relatively compact in construction and involves the use of comparatively few, easily assembled and readily replaceable parts, which is extremely accurate and completely reliable in operation, and otherwise well adapted to the purposes for which the same is intended.

Other objects and advantages of the present invention will become readily apparent by referring to the following detailed description and accompanying drawings.

It should be understood, however, that the detailed description and specific examples, for indicating the preferred embodiments of the invention, are given by way of illustration only, since various changes and modifications within the spirit and scope of the invention will become apparent as the description herein progresses.

In the drawings:

FIGURE 1 is a perspective view of a telescopic sight device according to this invention mounted on a pistol;

FIGURE 2 is a diagrammatic view of a "thin lens system" embodying the features of this invention;

FIGURE 3 is a view of an embodiment of the lens system according to this invention;

FIGURE 4 is a view generally similar to FIGURE 3 but showing the positioning of the respective lenses in a telescope barrel;

FIGURE 5 is an enlarged partial section view of a portion of the telescope barrel;

FIGURE 6 is a diagrammatic view illustrating features of a modified form of the lens system shown in FIGURE 3;

FIGURE 7 is a modified lens system including the features of FIGURE 6; and,

FIGURE 8 is a full section view of the lens system in FIGURE 7 mounted in a telescope barrel.

Reference is now made to the accompanying drawings wherein like numerals refer to similar elements.

In FIGURE 1, there is shown a telescope 10 according to this invention mounted on a firearm such as a pistol 12 by suitable brackets 14. As is apparent, the brackets 14 may be varied in construction according to the requirements of the particular firearm and therefore form no part of the present invention.

In order to present the concept of this invention, consideration will first be given to a theoretical optical system capable of achieving the desired result of reduced overall length together with extended eye relief.

Since lens thickness in optical systems are usually small compared with the focal length of the lenses, the concept of a "thin lens system" is quite helpful. To this end, by neglecting lens thickness, and considering only the distance between the lenses, a sound approach may be made to the optics problem, as the introduction of thickness into the final lens system is a subsequent correction problem.

Referring now to the lens diagram illustrated in FIGURE 2, there is shown a lens system 15 which includes an objective lens 16, ocular lens 18 and an intermediate erector lens system 20 which includes a pair of double convex lenses 22, 22'. The erector lens is a second objective working at finite conjugates for transmitting the image along the optical axis, while at the same time serving to erect an inverted image 24 formed by the first objective to an erected image 26. The optical symmetry of this theoretical system is favored under many circumstances since the principal light rays 27 which originate from the edge of the field of view and which pass through the objective lens 16, converge to a principal ray focal point forming an image of the aperture stop, as determined by the size of the eye pupil, at the exact center X of the erector lens system 20. Actual rays 29 from the object passed through lens 16 to form the inverted image 24. In turn, the inverted image 24 is focused by the erector lens system 20 in the form of the erected image 26, as viewed through the ocular lens 18. Distance A is therefore the difference in focus of lens 18 for objects situated at infinity relative to the distance to the aperture stop. For example, distance A is the difference in focus for infinity relative to the eye distance of substantially arm's length. Distance B is similarly the difference in focus of lens 16.

In the diagram, the distance A from the center of the system to the plane of the erected image 26 equals the distance B which extends between the center X of the system and the inverted image 24. These conjugate distances A and B are important for they must be such as to enable the erector lenses 22 and 22' to convert the inverted image 24 to an erected image 26, as is apparent. However, in the construction of a telescopic sight, the conjugate distances A and B must be short in order to reduce the overall length of this scope. However, the focal length of the erector lenses 22, 22' serve to limit the conjugate distances desired.

Additionally, the limiting length specifications of the telescope require these distances to be short; and, practical considerations of the focal length of the erector lenses 22, 22' place a limitation upon this. In view of these considerations, each of the distances A and B is arbitrarily selected to be approximately 10 mm., and herein lies a problem in the art in the development of a short telescopic sight having extended eye relief, for mounting on a pistol or the like. If the total length of the system is specified at about 110 mm. and 20 mm. is utilized for distances A and B, there is only 90 mm. to be divided equally between the focus $F_o$ of the objective lens 16 and the focus $F_e$ of the ocular lens 18, each of which thereby must be limited to 45 mm. respectively. As to each lens 16 and 18, the infinite-principal ray difference in focus ($D_f$) of each lens, which is distance B or A, as stated, equals approximately 10 mm., this distance being determined from the formula:

$$D_f = -\frac{F_e^2}{F_e + D}$$

where D is a negative value and is the distance to the object, in this case the observers eye which is a minus 635 mm. Substituting these values in the equation, $F_e$ (the focal length of the eyepiece) being equal to 45; $D_f$ equals 3.432 mm. instead of the 10 mm. $D_f$ required. As is apparent, by further substitutions in the equation, $F_e$ must equal 75 mm. to provide a $D_f$ distance of 10.044 mm. However, such a telescope would require an overall distance of about 170 mm. which is unduly long for a pistol sight. When allowance is made for the thickness of the lenses and so forth, the length would be very nearly equal to 7 inches, which is undesirable.

Inasmuch as the physical distance to the eye is fixed, there can be provided a short back focal length while providing a long equivalent focal length. In this regard, object distances are measured from the first principal point of a lens or system of lenses, while image distances are measured from the second principal point. The distance between the principal points Q may be obtained by the following equation:

$$Q = \frac{F_a \cdot d}{F_a + F_b - d}$$

where Q is the distance between the principal points and is approximately equal to the difference between the actual or eye relief distance and the effective or optical distance to the eye, $F_a$ is the focal length of one lens such as lens 18 in FIGURE 2, $F_b$ the focal length of another lens (not shown in FIGURE 2 but refers to negative lens 40 in FIGURE 3, for example), and $d$ is the distance between the lenses. The combined focal length of the two lenses is obtained by the following formula:

$$F_{ab} = \frac{F_a \cdot F_b}{F_a + F_b - d}$$

According to a feature of this invention, the values obtained in the simultaneous solution of these two equations is utilized.

Referring again to FIGURE 2, if the total length is about 110 mm. and a value of approximately 10 mm. is selected each for A and B, 45 mm. is provided each for the distances $F_o$ and $F_e$. A lens with a focal length of 60 mm. or greater may be provided within a space of 45 mm. or less by using a "telephoto" type lens. Substituting these values in the equations, the $D_f$ is found to be 7.412 mm. which is still not sufficient. In a like manner, the distance D would have to be reduced from 635 mm. to 487.5 mm. to obtain this value of 10 mm. for A and B.

According to a significant feature of this invention, the first principal point is moved towards the eye, for example, a distance of 147.5 mm. which would change the optical distance between the eye and the ocular lens 18 while leaving the actual distance at 635 mm.

The only requirement is to satisfy the three equations shown above simultaneously letting the distance D in the difference of focus $D_f$ equation be the effective or optical distance (e.g. 487.5 mm.), with Q being approximately equal also to the difference between the actual and optical distances, and setting the combined focal length $F_{ab}$ ($=F_e$ in the $D_f$ equation) at 65.

The powers and separations of the units necessary to do this are shown below.

$$F_{ab} = 65 = \frac{F_a \cdot F_b}{F_a + F_b - d}$$

Let $F_a$ equal 30.00 mm.
Let $F_b$ equal minus 10.6849300 mm.
Let $d$ equal 24.2465712 mm.

$$Q = 147.5 = \frac{F_a \cdot d}{F_a + F_b - d}$$

Let $F_a$ equal 30.00.
Let $F_b$ equal minus 10.6849300 mm.
Let $d$ equal 24.2465712.

It is seen that $F_a$ and $F_b$ and $d$ have the same values in both of these equations.

Thus, if we have a lens composed of a positive unit with a focal length of 30.00 mm. and a negative lens with a focal length of 10.6849300 mm. and separated by a distance of 24.2465712 mm., the combined focus will be 65.00 and the first principal point will be located 147.5 mm. in front of the system, giving a difference in focus of 10 mm. for an object at infinity and one at 635 mm. The separation given above is the separation of the second principal point of the first element from the first principal point of the second element.

The above considerations, of course, relate to a theoretical lens system in view of the fact that the thickness of the lens has been neglected. To this end, the thin lens system generally described in FIGURE 2 is replaced by a number of practical embodiments thereof which provide for a telescope sight of shorter length than heretofore available for pistols and the like, wherein the ocular lens 18 is a considerable distance from the eye. To this end, the principal points are positioned at specific places and are maintained in the practical embodiments of the invention. It is only by throwing the first principal point far outside the system itself toward the observers eye that the optical distance to the eye is reduced without reducing the mechanical distance; and, the position of this first principal point is determined by the characteristics of the erector system used. This is a significant consideration in the present invention.

Referring now to FIGURE 3 there is shown an optical system embodying features of the above described concept. This lens system 28 includes the theoretical embodiments of the lens system shown in FIGURE 2 and compensates for the thickness of the lenses. The system shown in FIGURE 3 has an overall length of approximately 110 mm., which is significantly shorter than heretofore provided for such sights, while providing the desired eye relief distance.

An objective lens system 30 includes double convex lenses 32 and 36 cemented to opposite sides of a double concave lens 34, which is known in the art as a triplet lens assembly. Longitudinally aligned with those lenses is a concavo-convex or meniscus lens 38, and spaced inwardly from the lens 38 is a negative "telephoto" lens 40, which together with lenses 32-38 make up the objective lens system 30. There is also provided an erector lens 42. Principal rays 29 are refracted by negative lens 40 to a point in the center of erector lens 42, while parallel rays 27 form the inverted image 24 at the focal point of the objective system including objective lens means 30 and negative lens means 40, giving rise to the difference of focus A, which is also the conjugate distance of erector 42 in the objective direction. The ocular system 44 is generally symmetrical to the objective system, there being provided also a telephoto negative lens 40′, a concavo-convex or meniscus lens 38′; and, aligned therewith, corresponding double convex lenses 32′ and 36′ cemented to opposite sides of a double concave lens 34′. With regard to the above formulas, the combined focal length $F_{ab}$ refers to the focal length of the ocular system 44 including positive lenses 32′-38′ and negative lens 40′, or alternatively, to the objective system 30. In either instance focal length $F_a$ is for the combined positive lenses, focal length $F_b$ is for the negative lens, and $d$ is the distance between those positive and negative lenses. Using $F_{ab}$ instead $F_e$ and making D in the $D_f$ equation the optical distance to the eye or objective, the difference in focus equation becomes $$D_f = -\frac{F_{ab}^2}{F_{ab}+D}$$

In the following table, significant values for an exemplary embodiment of the lens system shown in FIGURE 3 are provided. In this table, the refractive index "$n_D$" is given for the D line of the spectrum; the numeral "V" designates the nu value or reciprocal dispersion for the lens materials used; axial thickness is designated "$d$"; and the "R" values designate the respective radii of the spherical surfaces.

FIGURE 3 SYSTEM

[Measurements are in millimeters]

| Lens | $n_D$ | V | d | R1 | R2/3 | R4/5 | R6 |
|---|---|---|---|---|---|---|---|
| 32, 32′ | 1.5125 | 60.5 | .157 | 1.573 | .786 | | |
| 34, 34′ | 1.6210 | 36.2 | .020 | | .786 | .786 | |
| 36, 36′ | 1.5125 | 60.5 | .157 | | | .786 | 1.573 |
| 38, 38′ | 1.6210 | 36.2 | .098 | .630 | 1.171 | | |
| 40, 40′ | 1.523 | 58.6 | .020 | 1.547 | .1918 | | |
| 42 | 1.617 | 55.0 | .053 | .2285 | .2285 | | |

In the above example, the diameter of the objective lens is .700 in.; the diameter of the ocular lens is .600 in.; the diameter of the negative telephoto lenses 40, 40′ is .294 in. and the diameter of the erector lens 42 is .156 in. The following distances, measured along the optical axis O in FIGURE 3 designate the positioning of the respective lenses therealong; the axial distance F between the lenses 36 and 38 is 0.5 mm.; the axial distance G between the concave surface of the lens 38 and the convex side of the negative telephoto lens 40 is 19.993 mm.; the axial distance H between the concave side of the negative telephoto lens 40 and the convex side of the erector lens 42 is 22.065 mm. In view of the fact that this lens system is symmetrical relative to the erector lens 42, the corresponding values apply to the ocular portion of the lens system as well as the objective portion 44.

Turning now to FIGURES 4 and 5, the lenses in FIGURE 3 are shown positioned in the telescope 10 which includes an interior threaded objective lens barrel 50 concentrically mounted about an exterior threaded ocular lens barrel 52. The objective lens assembly 30 is retained in the enlarged end 54 of the objective lens barrel 50 by means of a spacer ring 56 disposed between the lenses 36 and 38, and a locking ring 58 secured outwardly adjacent the lens 32 as by a threaded engagement or the like. The interior surface of the barrel 50 receives a threaded telephoto retaining member 60 which is in the form of a cylindrical threaded sleeve having inwardly directed flange portion 62 against which the lens 40 abuts. There is also provided a threaded locking ring 64 which engages a chamfered portion of the negative lens 40. Also engaged within the barrel 50 is an erector lens mounting member 66 within which the erector lens 42 is mounted. In this regard, an erector locking ring 68 is provided which also serves as a holder for a crosshair 70 which, of course, is disposed on the image plane of the lens system in FIGURE 3.

The ocular lens system 44 is mounted in the barrel 60 together with the corresponding telephoto lens 40′ in a manner generally similar to the arrangement shown for the objective lens barrel 50.

A chamfered ring 72 is threadedly engaged on the ocular barrel 52 adjacent the end of the objective barrel 50, providing a means for securing the barrels 50 and 52 against relative movement while allowing for regulation of their relative axial spacing.

The optical system and telescope sight as described above operates at unit magnification. In order to increase the power of the sight whereby it will operate at approximately 1½ magnifications, the erector lens mounting member 66 is lengthened slightly on the order of approximately $\frac{1}{10}$ of an inch and the erector assembly is moved toward the objective lens assembly 30 until the crosshair 70 secured to the end of the erector lens mounting member 66 is brought into the plane of the image formed by the objective lens and the erector lens assembly. The telescope 10 can include manual means (not shown) whereby an increase in power of other than 1½ magnifications can be accomplished, whereby the erector lens mounting member 66 may be axially moved with respect to the objective lens barrel 50.

The lens system and sight shown and described in FIGURES 3, 4 and 5 is particularly suitable when the target is a stationary object; however, because of its complete symmetry, the entering and emerging field rays strike the first and last surface of the system at exactly the same height. As is apparent, unless the target and the observer's eye are exactly on the optical axis O, part of the field of view will be cut off. Therefore, any trembling or wobbling of the telescope 10 causes this partial "cut off" effect and it is to some extent a distracting factor and may be objectionable under certain circumstances.

So long as the symmetrical principle is followed, the only remedy is to make the objective lens of a diameter somewhat larger than that of the eyepiece.

According to another feature of this invention, a different provision is advanced for modifying the lens system in FIGURE 3 to particularly adapt the telescope 10 for use with moving targets. To this end, the total magnification is kept the same, but the erector system is "worked" at other than unit magnification, compensating for this by a change in focal length of the objective. It is thus important to "aim" the extreme principal ray from the observer's eye at the first principal point of the erector system.

Following the laws of optics, any ray directed toward the first principal point of a system, at any angle, will emerge from the lens system as if it came from the second principal point, and will make the same angle with the optical axis as before. In this way, the erector system will not materially contribute to the aberrations, such as lateral color, coma, and distortion.

In FIGURES 6 and 7, there is shown a modified erector lens system according to a feature of this invention. Referring to FIGURE 7, the lens system is shown to include an objective lens system 30′ and an ocular lens system 44′. The objective lens system 30′ includes two double convex lenses 80 and 84 cemented to a double concave lens 86. Aligned inwardly adjacent the double convex lens 84 is a concavo-convex or meniscus lens 88. The modified erector lens system 90 includes two opposed lenses 92, 92'; the ocular portion of the lens system includes a negative telephoto lens 40 and an ocular lens system corresponding to the ocular system shown in FIGURE 3 which includes respectively lenses 32', 34', 36' and 38' arranged generally as described in the embodiment in FIGURE 3.

Considering now the modified erector lens system 90 in FIGURES 6 and 7, it will be remembered that the $D_f$ in the previous embodiment was approximately 10 mm. so that this value is equal to the conjugate image distances of the erector system. This arrangement passes the principal ray to the first principal point of the erectors. In view of the fact that this value was used for the second conjugate image distance the erectors "worked" at a 1:1 ratio. The focal length of the lens system required to handle conjugate image distances, when these are referred to as principal points, are obtained in this case by the formula:

$$\frac{1}{f} = \frac{1}{A} + \frac{1}{B}$$

where A and B are the conjugate distances. The arrangement is modified in this embodiment of the invention in that the conjugate image distance on the eyepiece end of the erectors equals the $D_f$ of the eyepiece, but the other conjugate image distance on the objective side of the erectors is changed to 7/10 of this value. The erector then magnifies the image formed by the objective by a 10:7 ratio and thereby keeps the total magnification of the telescope the same if the focal length of the objective is reduced to 7/10 its former value.

Placing these values in the above formula provides the necessary focal length of the erectors to accommodate this situation. This erector could be a single lens but the surfaces become rather steep and therefore has been broken down into two lenses, according to this invention. To do this, the combined focus of the lens, as previously mentioned is:

$$F_{ab} = \frac{F_a \cdot F_b}{F_a + F_b - d}$$

and the distance between the principal points Q is obtained, as mentioned, from the equation $$Q = \frac{F_a \cdot d}{F_a + F_b - d}$$

By this arrangement, the principal rays no longer emerge from the objective at the same height as they enter the eyepiece; the angle is the same as the power was kept constant; however, the entrance window (which is the image of the eye formed in front of the scope by the entire system) for the telescope has now been moved in much closer to the objective. Thus, if the size of the objective is kept equal, a good portion of it will be used only to prevent the undesirable "cut off" effect previously mentioned.

An exemplary arrangement of this erector embodiment is shown in FIGURE 6 wherein the first principal point $P_1$ and the second principal point $P_2$ are separated according to the above formula, the image $h'$ being 10/7 the height of the image $h$ on the objective image plane. Thus, if the principal point conjugates $pp_1$ and $pp_2$ are 9.793 mm. and 6.855 mm. respectively, from exemplary calculations the height disposed on the eyepiece image plane is 10/7 the value the corresponding height on the objective image plane; as $$h' = \frac{h \cdot pp_1}{pp_2}$$

Referring again to FIGURE 7, the following table provides exemplary values for a typical lens system 28' including features of the present modified embodiment of the invention:

FIGURE 7

| Lens | $n_D$ | V | d | R1 | R2/3 | R4/5 | R6 |
|---|---|---|---|---|---|---|---|
| 32' | 1.5125 | 60.5 | .157 | 1.573 | .786 | | |
| 34' | 1.6210 | 36.2 | .020 | | .786 | .786 | |
| 36' | 1.5125 | 60.5 | .157 | | | .786 | 1.573 |
| 38' | 1.6210 | 36.2 | .098 | .630 | 1.171 | | |
| 40 | 1.523 | 58.6 | .020 | 1.547 | .1918 | | |
| 82 | 1.5125 | 60.5 | .175 | | | 1.200 | 2.420 |
| 84 | 1.6210 | 36.2 | .025 | | 1.200 | 1.200 | |
| 86 | 1.5125 | 60.5 | .175 | 2.420 | 1.200 | | |
| 88 | 1.5795 | 41.0 | .100 | 1.000 | 2.196 | | |
| 92, 92' | 1.617 | 55.0 | .032 | .7874 | 2.1875 | | |

The values of the distances between the respective lenses measured along the optical axis O in FIGURE 7 are as follows: the axial distance between the adjacent objective lenses 84 and 88 distance .025 in., the axial distance between the concave side of the lens 88 and the convex side of the erector lens 92, 1.853 in., the axial distance between the erector lens 92' and the concave side of the negative telephoto lens 40, .8335 in. and the distance between the convex side of the telephoto lens 40 and the concavo-convex meniscus lens 38', .787 in., with a spacing of .020 in. between the lenses 38' and 36'.

The lens system in FIGURE 8 is mounted in the telescope 10' in a manner generally similar to the mounting arrangement shown in FIGURE 5. To this end, however, the modified erector lens mounting member 66' is provided with spacer means 96 to properly position the lenses 92, 92' relative to each other.

It will, therefore, be seen that there has been provided by this invention a structure in which the various objects hereinbefore set forth, together with many practical advantages, are successfully achieved.

As various possible embodiments may be made of the mechanical features of this invention, all without departing from the scope thereof, it is to be understood that all matters herein set forth or shown in the accompanying drawings is to be interpreted in an illustrative, and not in a limiting sense.

I claim:

An optical system comprising: ocular lens means; objective lens means spaced apart from said ocular lens means along an optical axis, erector lens means disposed on said optical axis intermediate said objective lens means and said ocular lens means; and negative lens means disposed on said optical axis intermediate said ocular lens means and said erector lens means to provide an extended eye relief distance of substantially arm's length, said ocular and negative lens means comprising an ocular system with the principal rays passing through the ocular system from the edge of the field thereof converging at the center of the erector lens means, the optical distance D to the eye, which is an aperture stop of the system, being measured from the first principal point of the ocular system, and the image distance denoted as the distance to the image of the eye formed by said ocular system being measured from the second principal point of the ocular system, the distance between the said principal points being obtained by the following equation:

$$Q = \frac{F_a \cdot d}{F_a + F_b - d}$$

where Q is the distance between the said principal points and is approximately equal to the difference between said eye relief and optical distances, $F_a$ is the focal length of said ocular lens means, $F_b$ the focal length of said negative lens means and $d$ is the distance between the said ocular and negative lens means, and the combined focal length $F_{ab}$ of the said ocular system being obtained by the following formula:

$$F_{ab}=\frac{F_a \cdot F_b}{F_a+F_b=d}$$

the difference in focus $D_f$ of the ocular system for infinity and for the eye distance of substantially arm's length being substantially equal to the conjugate distance for the erector lens means in the ocular system direction, said difference in focus $D_f$ being equal to $$\frac{F_{ab}^2}{F_{ab}+D}$$

whereby a simultaneous solution of the above three equations provides for said optical system with a desired physical length and a required eye relief.

References Cited in the file of this patent
UNITED STATES PATENTS

| | | |
|---|---|---|
| 193,816 | Gundlach | Aug. 7, 1877 |
| 1,317,749 | Aldis | Oct. 7, 1919 |
| 2,207,124 | Kollmorgen | July 9, 1940 |
| 2,217,281 | Konig | Oct. 8, 1940 |
| 2,719,457 | Tripp | Oct. 4, 1955 |
| 2,955,512 | Kollmorgen | Oct. 11, 1960 |

FOREIGN PATENTS

| | | |
|---|---|---|
| 67,823 | Germany | Apr. 15, 1893 |